US008710470B2

(12) United States Patent
Gattass et al.

(10) Patent No.: US 8,710,470 B2
(45) Date of Patent: Apr. 29, 2014

(54) WAVELENGTH AND POWER SCALABLE WAVEGUIDING-BASED INFRARED LASER SYSTEM

(71) Applicants: Rafael R. Gattass, Washington, DC (US); Leslie Brandon Shaw, Woodbridge, VA (US); Jasbinder S. Sanghera, Ashburn, VA (US); Ishwar D. Aggarwal, Charlotte, NC (US); Lynda E Busse, Alexandria, VA (US)

(72) Inventors: Rafael R. Gattass, Washington, DC (US); Leslie Brandon Shaw, Woodbridge, VA (US); Jasbinder S. Sanghera, Ashburn, VA (US); Ishwar D. Aggarwal, Charlotte, NC (US); Lynda E Busse, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/939,514

(22) Filed: Jul. 11, 2013

(65) Prior Publication Data

US 2014/0014858 A1 Jan. 16, 2014

Related U.S. Application Data

(60) Provisional application No. 61/670,627, filed on Jul. 12, 2012.

(51) Int. Cl.
*G01J 1/00* (2006.01)

(52) U.S. Cl.
USPC ........... 250/495.1; 250/504 R; 372/1; 372/32; 29/428

(58) Field of Classification Search
USPC .............................. 250/495.1, 504 R; 29/428
See application file for complete search history.

(56) References Cited

U.S. PATENT DOCUMENTS 8,306,077 B2 * 11/2012 Pushkarsky et al. ............ 372/32

* cited by examiner

*Primary Examiner* — Jack Berman
*Assistant Examiner* — Meenakshi Sahu
(74) *Attorney, Agent, or Firm* — US Naval Research Laboratory; Rebecca L. Forman

(57) ABSTRACT

An infrared laser source system that combines laser emitters through an optical waveguide. Each emitter is coupled to a port of the optical waveguide and the waveguided signal is combined to provide a spatially combined laser source with a single common exit aperture. The materials used for waveguiding allow the propagation of wavelengths in the infrared. The system can be used for combining multiple laser emitters to increase the total output power and/or for combination of multiple emitters with different wavelength for increased spectral coverage out of the laser system.

36 Claims, 5 Drawing Sheets

IR fiber

Lasers emitters

WAVELENGTH AND POWER SCALABLE WAVEGUIDING-BASED INFRARED LASER SYSTEM

PRIORITY CLAIM

This Application claims priority from U.S. Provisional Application No. 61/670,627 filed on Jul. 12, 2012 by Rafael Gattass et al., entitled "Infrared Optical Waveguide Combiner," the entire contents of which are incorporated herein by reference.

BACKGROUND OF THE INVENTION

1. Field of the Invention

The present invention relates generally to infrared fiber optics and, more specifically, to wavelength and power scalable waveguiding-based infrared laser systems.

2. Description of the Prior Art

Scientific advancements are constantly improving the availability of laser sources. In the infrared range, lasers are used for a myriad of applications such as but not limited to medical, sensing, defense, characterization, etc. However, applications continually drive the need for higher power or broader range laser systems with optical mode characteristics. In particular, for certain applications, the valuable metric is not solely power or spectral range, but must include spatial homogeneity and divergence.

The near-infrared optical window is roughly defined as covering optical wavelengths from 0.8-2 μm. The mid-infrared optical window is roughly defined as covering optical wavelengths from 2-5 μm. The long-wave infrared range is roughly defined as covering optical wavelengths 5-30 μm. The development of a system architecture that functions in the infrared range (including mid-infrared or long-infrared) which provides for scaling of power and/or wavelength capabilities while providing a single output with appropriate spatial and divergence characteristics has been lacking.

Optical waveguides consists of a core surrounded by one or more claddings. Light travels in the core and is confined by the index difference between the core and cladding. Optical waveguides can be fabricated as fibers or planar devices.

Chalcogenide fiber is fiber composed of the chalcogen elements sulfur, selenium, and tellurium. Typically, other elements are added to stabilize the glass. Arsenic sulfide ($As_2S_3$), arsenic selenide ($As_2Se_3$), germanium arsenic sulfide, and germanium arsenic selenide are a few examples of chalcogenide glass.

Pushkarsky (U.S. Pat. No. 8,306,077) teaches a method for assembling a laser source based on laser emitters whose wavelengths are in the infrared (3-14 um) through the spatial combination of laser beams. The assembly of Pushkarsky involves a plurality of optical elements attached to a base plate and mechanically aligned to generate a specific geometrical arrangement prior to an optical lens. The use of externally mechanically aligned optical elements is sensitive to thermal and vibrational changes. This approach imposes a restriction on the design of the laser by imposing severe conditions for maintaining the pointing stability such as careful thermal management of over the entire laser assembly and mechanical vibration stability over the entire laser assembly.

BRIEF SUMMARY OF THE INVENTION

The present invention provides a laser source system that combines multiple infrared laser sources providing a spatially combined laser beam. The laser sources can operate at the same wavelength range, as in the case of power scaling, or with different wavelength, for the case of spectral, and spatially-combined outputs or in a combination of both for power-scaled multiple-wavelength spatially-combined output. The system consists of multiple laser sources and an optical waveguide-based combiner. The combined light exits the waveguide through a common aperture. The material used for the optical combiner allows transmission of wavelength in the infrared range such as near-infrared, mid-infrared, and long-wave-infrared, depending on the specific composition and design. In particular the present invention covers a system with multiple laser systems spanning one infrared band (e.g. mid-infrared or and long-wave infrared) but also systems comprising multiple laser systems spanning two (e.g. near-infrared and mid-infrared or near-infrared and long-wave-infrared or mid-infrared and long-wave-infrared) or three infrared bands (near-infrared and mid-infrared and long-wave-infrared).

The system of the present invention reduces the complexity of beam combined sources in the mid-infrared and limits the number of failure points for the system by isolating the coupling of the laser emitter to the fiber from the beam combining. The compact size and localized thermal and vibrational stabilization requirements represent a size and weight benefit with respect to the current technology. Such a system would have applications in spectroscopy, LIDAR, IRCM, laser surgery, and free space communications.

The present system has advantages over other demonstrated laser systems and assemblies. Laser assemblies have been proposed based on multiple beam combination through spatial overlap and/or spectral beam combination. Both approaches in the mid-IR and possible approaches in the long-wave-infrared have been limited to mechanically mounted beam steering elements such as minors and prisms. In such an approach, a large number of individual elements are used (usually larger than the number of laser emitters being coupled). The position and orientation of each element with respect to each other must be kept constant presenting restrictive requirements on thermal and vibration management. Besides thermal and vibration requirements, the complexity of the system increases significantly with increasing number of ports. The system of the present invention is scalable to an arbitrary number of emitters while maintaining the same restrictions on stability per laser element resulting in a small compact package.

These and other features and advantages of the invention, as well as the invention itself, will become better understood by reference to the following detailed description, appended claims, and accompanying drawings.

DETAILED DESCRIPTION OF THE INVENTION

Figure 1:
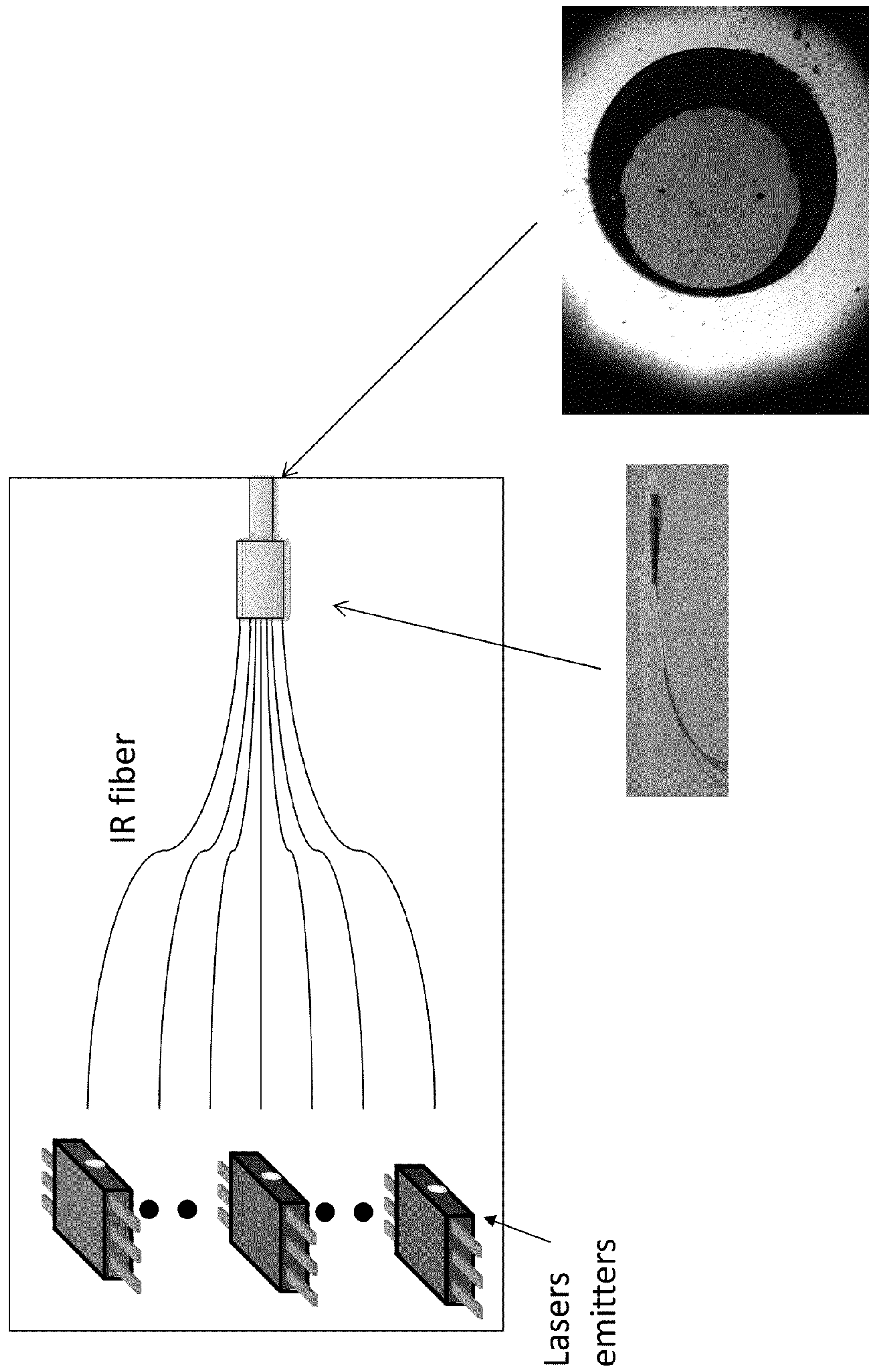
FIG. 1 is a schematic diagram of a laser source with optical waveguiding by optical fibers, an image of a packaged optical fiber combiner comprising seven multimode arsenic sulfide fibers, and the output face of the optical combiner.

The present invention provides a laser source system that combines laser emitters through an optical waveguide. Each emitter is coupled to a port of the optical waveguide and the waveguided signal is combined to provide a spatially combined laser source with a single common exit aperture. The materials used for waveguiding allow the propagation of wavelengths in the infrared. The system can be used for combining multiple laser emitters to increase the total output power and/or for combination of multiple emitters with different wavelength for increased spectral coverage out of the laser system.

In another embodiment, the waveguide combined laser system with common exit aperture can be connected to a single optical fiber or an N-port optical switch which in turn is connected to N-optical fibers. Power from the common aperture can be transported by the single optical fiber or switched by the N-port switch to be transported into any of the optical fibers attached to the switch. Note that the switch can be designed to direct all optical power to one fiber or split optical power into 2 to N fibers. The optical fiber(s) from the lasers can, in turn, be attached to an optical beam steering device for directing the optical beam.

A number N of laser emitters operating at center wavelengths $\lambda_1$, $\lambda_2$, $\lambda_N$ are coupled to individual waveguiding elements (such as but not limited to optical fibers and planar waveguides). Each waveguiding element port is combined to achieve output of all laser systems in a single output aperture with common divergence characteristics. Coupling to the waveguiding element can be accomplished through a variety of methods including but not limited to a sequence of lenses, lensing of an optical fiber, splicing of fiber outputs, tapering of a waveguide, diffraction gratings and direct bonding to the laser emitter.

The laser emitters can have the same center wavelength or different wavelengths or a combination where some laser emitters have the same wavelength while other emitters in the system have different center wavelength. The beam shape, divergence and power of the lasers emitters do not need to be the same. The laser emitters can be based on but are not limited to laser diodes, quantum cascade lasers, intraband cascade lasers, rare-earth doped glasses, crystals or fibers, Raman gain lasers, optical parametric amplifiers.

The optical waveguiding element can be based on planar optical waveguides or optical fibers. The input side of the optical fibers and planar waveguides can be either multimode or single mode, while the output side of the combiner would preferably be multimode but could be single mode. The waveguiding element if planar waveguide based can be manufactured of a variety of materials chosen such that the material is transparent to the wavelength of the lasers; such as but not restricted to silicon, silicon nitride, germanium, sapphire, diamond, gallium, SiGe, InAs, AlSb, InGaAs, AlAsSb, GaAs, AlGaAs, InAlAs, and InP. If the waveguiding element is based on an optical fiber, the fiber can be made of chalcogenide glasses, fluoride glasses, oxides including telluride and tellurite glass.

The laser light from the emitters that is individually coupled into waveguiding structures will be combined into a single output. For the case of a planar waveguide guiding structure, an array waveguide grating is used to couple source of multiple wavelengths into a single output, while for the case of a power combiner a couple mode array waveguide. For the case of fiber optical guiding structure, the system will include a fused fiber coupler independent of power or wavelength scaling.

Demonstration 1

Figure 2:
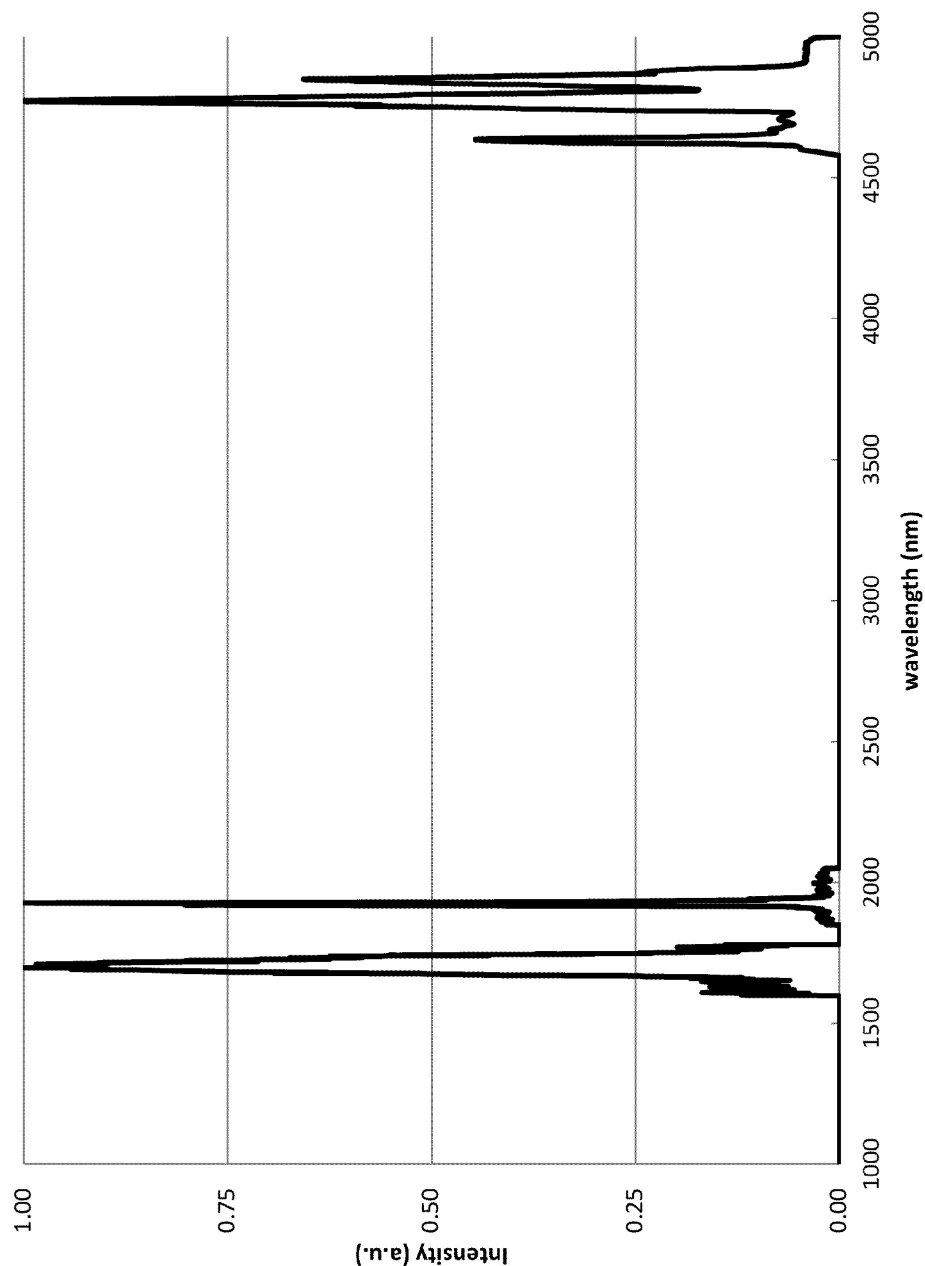
FIG. 2 shows the output of a laser source showing the combination of three laser emitters with different wavelengths covering two infrared bands: near-infrared and mid-infrared.

Three laser emitters centered at wavelengths 1.7 μm, 1.98 μm and 4.8 um are combined with a single fiber based output. An imaging lens was used to couple each laser into an Arsenic Sulfide chalcogenide fiber with core diameter of 100 μm core. FIG. 1 shows a schematic of the architecture used in the system and a digital image of the package fiber coupler and the output face of the coupler. FIG. 2 shows the spectrum at the fiber output indicating that the various wavelengths are being outputted from the same aperture.

Demonstration 2

Figure 3:
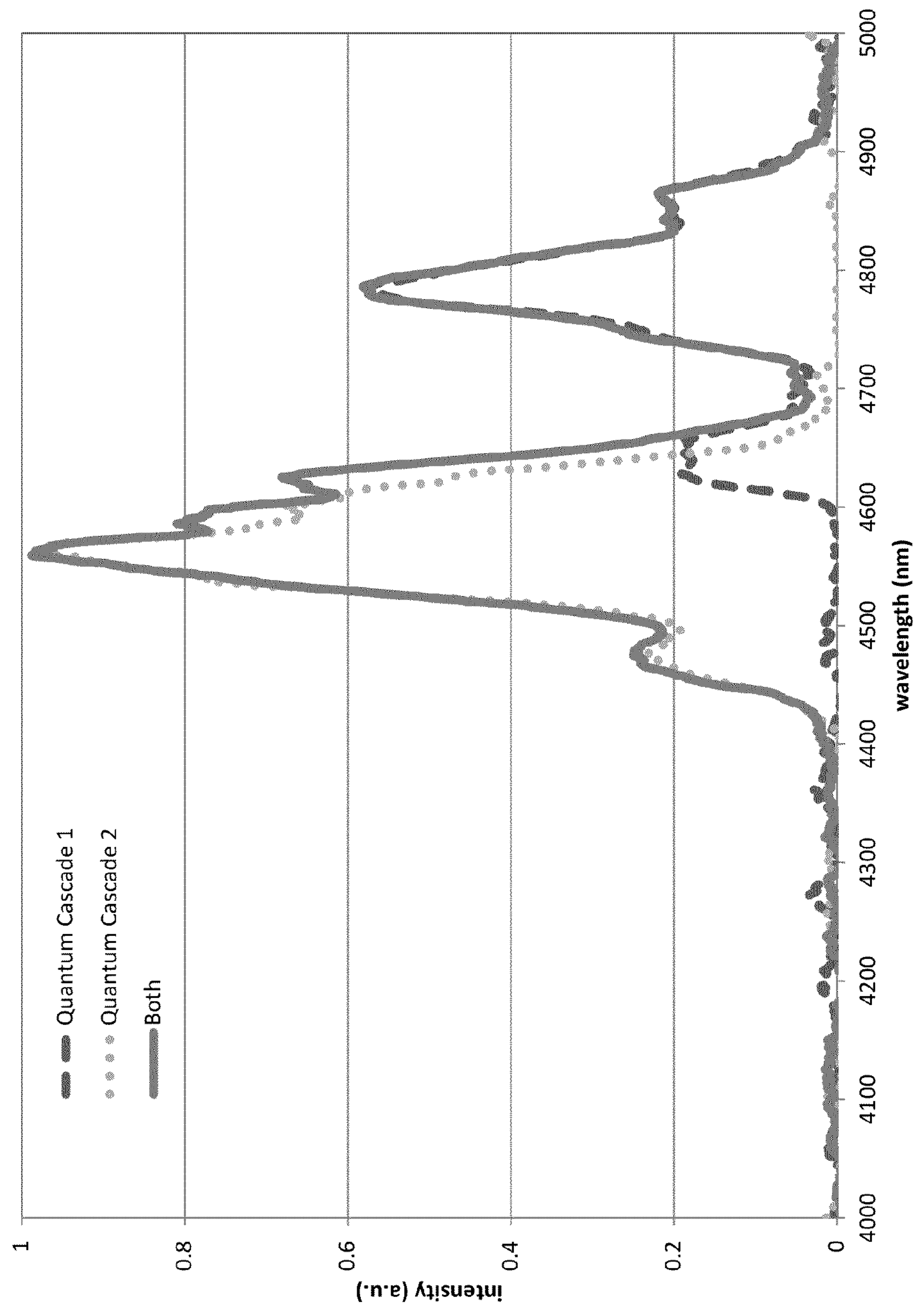
FIG. 3 shows the output of a laser source showing the combination of two different quantum cascade lasers with different wavelengths in the mid-infrared.

A system composed of two quantum cascade laser emitters in the mid-infrared range are coupled with an optical fiber, resulting in a single optical fiber output. An imaging lens was used to couple each laser into an Arsenic Sulfide chalcogenide fiber with core diameter of 100 μm core. FIG. 3 shows the spectrum at the fiber output indicating that the various wavelengths are being outputted from the same aperture.

Example 1

A quantum cascade laser with mid-IR emission (such as a laser emitter with wavelength centered around 4.6 μm) is coupled to a single mode chalcogenide optical fiber. A second quantum cascade laser with same emission wavelength and power is coupled to another identical optical fiber. Each optical fiber is fused together in a fiber based optical combiner, having a common output aperture and divergence. The coupling from each laser can be accomplished through a series of lenses, lensing of the output face of the optical fiber or direct optical bonding of the fiber to the emitter chip. Thermal and vibration isolation can be localized to the emitter to fiber region, not requiring coherence or stability across different laser emitters.

Example 2

Figure 4:
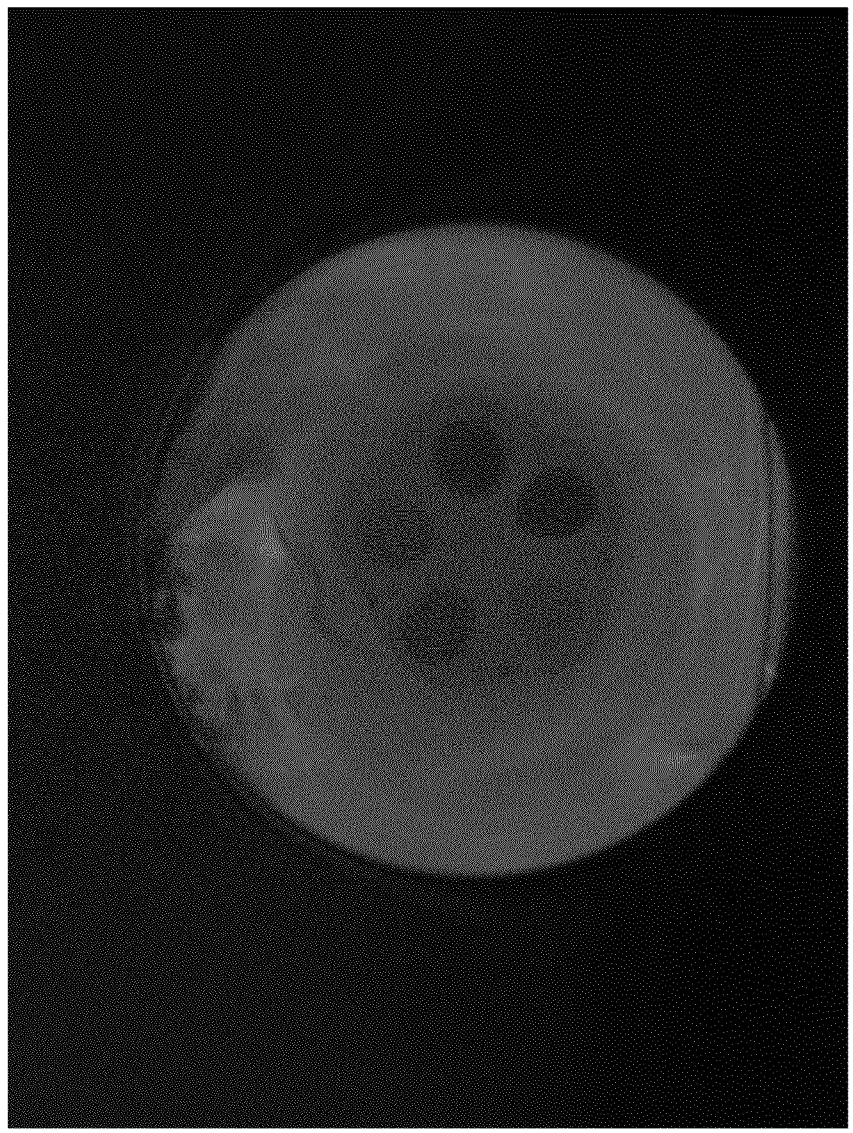
FIG. 4 shows the endface of 5 to 1 fiber based optical combiner cut before final core mixing.

The system described in Example 1 where additional laser emitters at distinct wavelengths are added to the fiber combiner. Each laser emitter is coupled to a different fiber port, and the optical fibers can be multimode. FIG. 4 shows the endface of a multimode fiber coupler fabricated with chalcogenide fiber, prior to the fusion of all the cores.

Example 3

A system of chip based laser emitters are fabricated in a single chip or bonded together onto a chip. The output of the laser emitters is routed into an array of waveguides in a silicon chip. The light is waveguided into an array waveguide grating and the output is coupled to a single output waveguide element.

Example 4

Figure 5:
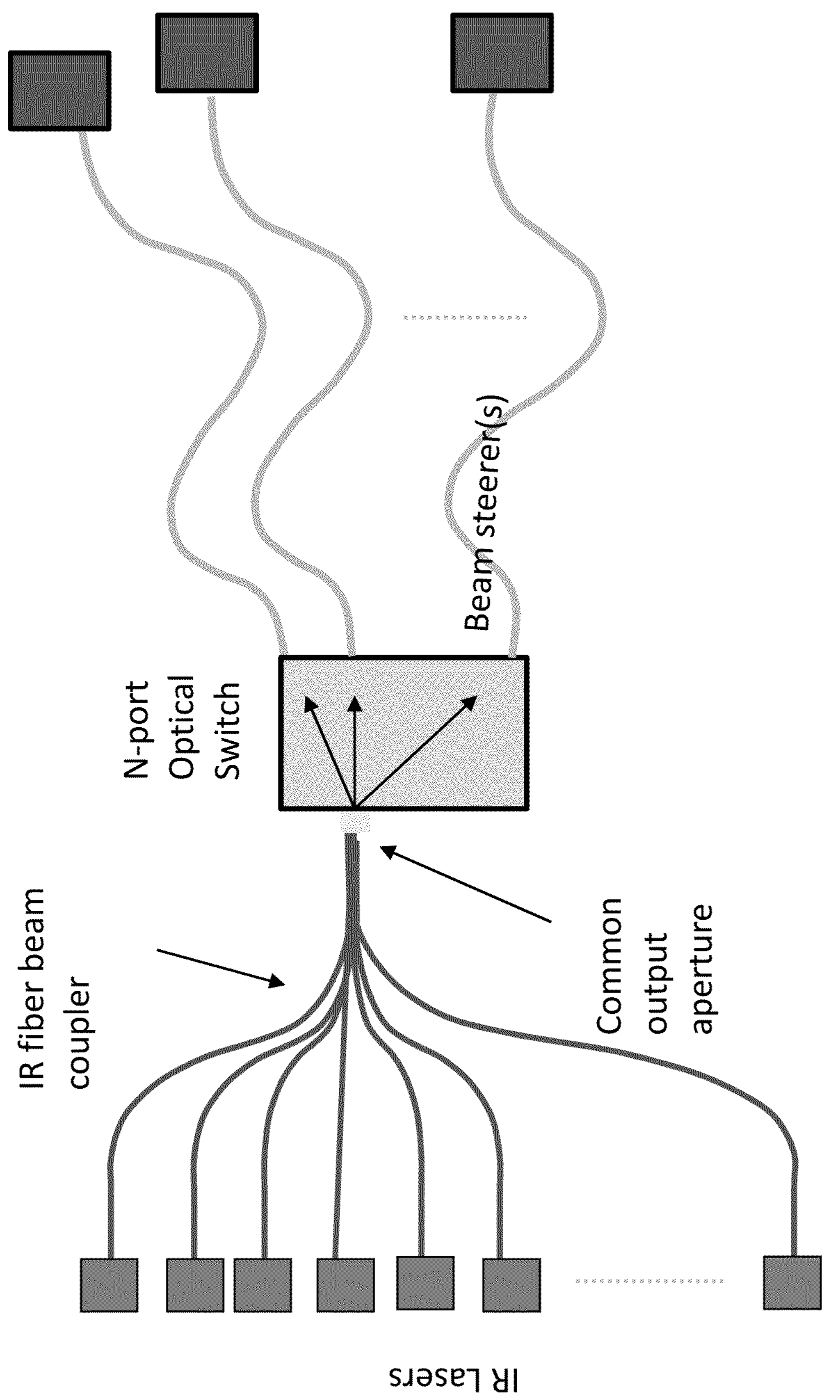
FIG. 5 is a schematic diagram of a laser source system with infrared fiber-based optical combiner and N port optical switch. The fiber combiner provides a common aperture for all laser beams, combining the power of each laser. The switch selectively directs the combined optical power to a single beam steering element.

A system architecture where laser emitters are combined into a single infrared fiber output port by use of a fiber based combiner, and subsequently the output of the combiner is directed to a multiple port switch such as a 1×N switch. The combined laser power is then guided to one of many individual beam steerers as shown in FIG. 5.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. An infrared laser system, comprising:
- at least two laser emitters;
- an optical waveguiding element coupled to each laser emitter; and
- an optical combiner that combines all of the waveguiding elements into a single combined laser source having a single common exit aperture.

2. The infrared laser system of claim 1, wherein each waveguiding element is an optical fiber, a planar waveguide, or any combination thereof.

3. The infrared laser system of claim 1, wherein each waveguiding element is a planar waveguide comprising silicon, silicon nitride, germanium, sapphire, diamond, gallium, SiGe, InAs, AlSb, InGaAs, AlAsSb, GaAs, AlGaAs, InAlAs, InP, or any combination thereof.

4. The infrared laser system of claim 1, wherein each waveguiding element is an optical fiber comprising chalcogenide glass, fluoride glass, oxides including telluride and tellurite glass, or any combination thereof.

5. The infrared laser system of claim 1, wherein the coupling to the waveguiding element comprises using a sequence of lenses, lensing of an optical fiber, splicing of fiber outputs, tapering of a waveguide, using diffraction gratings, direct bonding to the laser emitter, or any combination thereof.

6. The infrared laser system of claim 1, wherein the laser emitters have the same center wavelength, different center wavelengths, or a combination where some laser emitters have the same wavelength while other laser emitters have different center wavelengths.

7. The infrared laser system of claim 1, wherein laser power of the combined laser source is greater than laser power of a single laser emitter.

8. The infrared laser system of claim 1, wherein multiple laser emitters at the same wavelength have power levels greater than 1 W without limiting power scaling of the laser system.

9. The system of claim 8, wherein laser power of the combined laser source may exceed 1000 W.

10. The infrared system of claim 1, wherein each laser emitter spans a single infrared band, and the infrared laser system emits a single infrared band.

11. The infrared system of claim 1, wherein the laser emitters span two infrared bands, and the infrared laser system emits two infrared bands.

12. The infrared system of claim 1, wherein the laser emitters span three infrared bands, and the infrared laser system emits three infrared bands.

13. The infrared laser system of claim 1, wherein the laser emitters comprise laser diodes, quantum cascade lasers, intraband cascade lasers, rare-earth doped glasses, crystals, or fibers, Raman gain lasers, optical parametric amplifiers, or any combination thereof.

14. The infrared laser system of claim 1, wherein the input side of the optical waveguiding element is multimode or single mode.

15. The infrared laser system of claim 1, wherein the output side of the optical combiner is multimode.

16. The infrared laser system of claim 1, additionally comprising an N-port optical switch with the single combined laser source entering the N-port optical switch and with at least one N-optical fiber attached to the output of the N-port optical switch.

17. The infrared laser system of claim 16, wherein the switch can direct all optical power to one N-optical fiber or split the optical power into multiple N-optical fibers.

18. The infrared laser system of claim 16, wherein the N-optical fiber is attached to an optical beam steering device.

19. A method of providing an infrared laser source, comprising:
- coupling a laser emitter to an optical waveguiding element;
- coupling a second laser emitter to a second optical waveguiding element;
- optionally coupling additional laser emitters to additional optical waveguiding elements; and
- combining all of the optical waveguiding elements with an optical combiner to produce a single combined laser source.

20. The method of claim 19, wherein each waveguiding element is an optical fiber, a planar waveguide, or any combination thereof.

21. The method of claim 19, wherein each waveguiding element is a planar waveguide comprising silicon, silicon nitride, germanium, sapphire, diamond, gallium, SiGe, InAs, AlSb, InGaAs, AlAsSb, GaAs, AlGaAs, InAlAs, InP, or any combination thereof.

22. The method of claim 19, wherein each waveguiding element is an optical fiber comprising chalcogenide glass, fluoride glass, oxides including telluride and tellurite glass, or any combination thereof.

23. The method of claim 19, wherein the coupling to the waveguiding element comprises using a sequence of lenses, lensing of an optical fiber, splicing of fiber outputs, tapering of a waveguide, using diffraction gratings, direct bonding to the laser emitter, or any combination thereof.

24. The method of claim 19, wherein the laser emitters have the same center wavelength, different center wavelengths, or a combination where some laser emitters have the same wavelength while other laser emitters have different center wavelengths.

25. The method of claim 19, wherein laser power of the combined laser source is greater than laser power of a single laser emitter.

26. The method of claim 19, wherein multiple laser emitters at the same wavelength have power levels greater than 1 W without limiting power scaling of the laser system.

27. The method of claim 19, wherein laser power of the combined laser source may exceed 1000 W.

28. The method of claim 19, wherein each laser emitter spans a single infrared band and the infrared laser system emits a single infrared band.

29. The method of claim 19, wherein the laser emitters span two infrared bands and the infrared laser system emits two infrared bands.

30. The method of claim 19, wherein the laser emitters span three infrared bands and the infrared laser system emits three infrared bands.

31. The method of claim 19, wherein the laser emitters comprise laser diodes, quantum cascade lasers, intraband cascade lasers, rare-earth doped glasses, crystals, or fibers, Raman gain lasers, optical parametric amplifiers, or any combination thereof.

32. The method of claim 19, wherein the input side of the optical waveguiding element is multimode or single mode.

33. The method of claim 19, wherein the output side of the optical combiner is multimode.

34. The method of claim 19, additionally comprising connecting the single combined laser source to an N-port optical switch with at least one N-optical fiber attached to the output of the N-port optical switch.

35. The method of claim 34, wherein the switch can direct all optical power to one N-optical fiber or split the optical power into multiple N-optical fibers.

36. The method of claim 34, wherein the N-optical fiber is attached to an optical beam steering device.

* * * * *